United States Patent [19]
Holvoet

[11] Patent Number: 4,589,166
[45] Date of Patent: May 20, 1986

[54] PROCESS FOR DISINTEGRATING AND RECONSTITUTING A PAD OF FIBERS

[75] Inventor: Marcel Holvoet, Louviers, France

[73] Assignees: Beghin-Say S.A., Thumeries, France; Nicolas Drouzas, Antwerp, Belgium

[21] Appl. No.: 667,494

[22] PCT Filed: Feb. 13, 1984

[86] PCT No.: PCT/FR84/00031

§ 371 Date: Oct. 15, 1984

§ 102(e) Date: Oct. 15, 1984

[87] PCT Pub. No.: WO84/03309

PCT Pub. Date: Aug. 30, 1984

[30] Foreign Application Priority Data

Feb. 15, 1983 [FR] France ............................... 83 02370

[51] Int. Cl.$^4$ ............................................. D01G 11/00
[52] U.S. Cl. ......................................... 19/82; 19/145.7
[58] Field of Search ................ 19/0.3, 0.35, 82, 145.7, 19/145

[56] References Cited

U.S. PATENT DOCUMENTS

| | | | |
|---|---|---|---|
| 4,130,915 | 12/1978 | Gotchel | 19/304 |
| 4,384,708 | 5/1983 | Laplanche | 19/82 |
| 4,484,377 | 11/1984 | Morel | 19/82 |

FOREIGN PATENT DOCUMENTS

| | | |
|---|---|---|
| 0662569 | 8/1965 | Belgium . |
| 2850340 | 5/1980 | Fed. Rep. of Germany . |
| 1432694 | 2/1966 | France . |
| 1467276 | 12/1966 | France . |
| 2283247 | 3/1976 | France . |
| 0081731 | 7/1978 | Japan ..................... 19/82 |

*Primary Examiner*—Louis K. Rimrodt
*Attorney, Agent, or Firm*—A. W. Breiner

[57] ABSTRACT

The invention relates to bleached cotton fibers and to absorbing materials for disposable articles. Its object is a process for shortening bleached cotton fibers consisting in (a) moving a fiber pad (1) between a trough-plate (2) and a feed roller (5) exerting a pressure between 0.3 and 0.6 MPa on the fiber pad,
(b) pulling the fiber pad (1) beyond the trough-plate (2) bevelled at (9) so as to cut the long fibers constituting the fiber pad,
(c) reconstituting the sheet.

This process makes it possible to obtain fibers which can be used directly in diaper-making machines. The disposable articles so produced offer remarkable absorbing properties.

9 Claims, 2 Drawing Figures

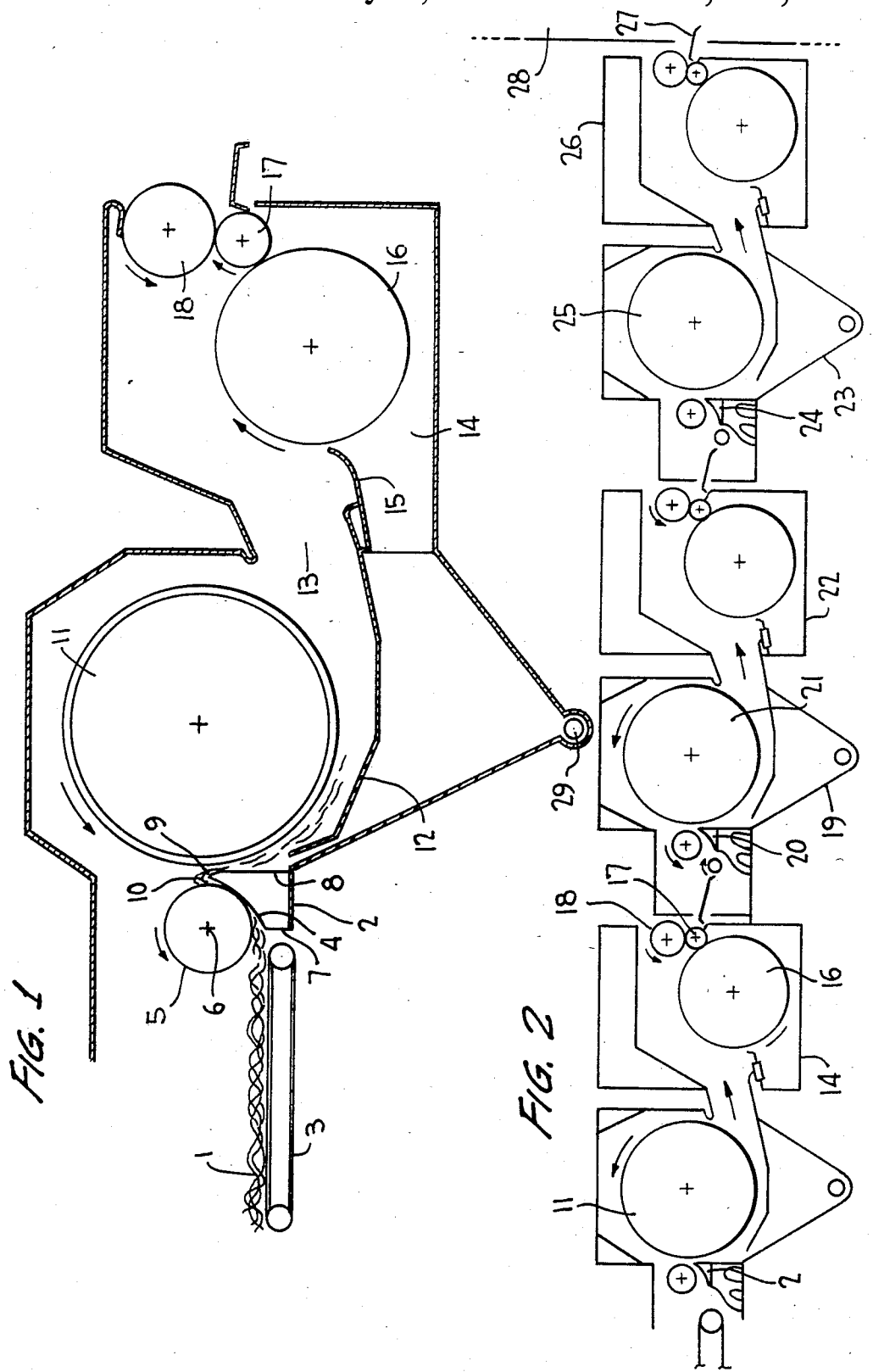

PROCESS FOR DISINTEGRATING AND RECONSTITUTING A PAD OF FIBERS

The invention relates to a process for shortening textile fibers, in particular bleached cotton wastes, consisting in:

(a) continuously moving a pad of fibers between a trough-plate and a feed roller provided with rounded roughnesses which rotates in the feed direction of the fiber pad and compresses it, (b) pulling the fiber pad beyond the trough-plate by means of a drum provided with cutting roughnesses rotating in the same direction as the feed roller but at a higher tangential speed than said cylinder, (c) reconstituting the sheet of fibers, Another object of the invention are the textile fibers obtained by this process and their use in making absorbing pads for disposable articles, in particular for baby diapers.

The dry fabrication of non-woven materials from short fibers is known. However, the implemented methods do not shorten the fibers, merely they open the raw material and distribute the fiber in random or unidirectional manner depending on the desired non-woven material.

The opening or tearing of the fibers consists in moving the fiber pad between a trough-shaped support and a feed roller compressing the pad by 0.08 to 0.12 MPa and then in placing the sheet so formed against a break-up drum with spikes which rotates at a tangential speed up to 30 times that of the feed cylinder.

These known methods are described in particular in the following patents:

French Pat. No. 2,322,941 describes a method of preparation by carding wherein an initial sheet of textile flocks is moved to a trough-shaped table by the feed roller and then is placed against another rotary break-up so as to mechanically untangle, open, and clean said sheet. The fiber tufts so obtained then are pneumatically dispersed in a conduit subject to air circulation and then collected on a perforated surface.

French Pat. No. 2,411,257 describes also an apparatus for opening and cleaning cotton wastes using untangling rollers located in the untangling zone.

French Pat. No. 2,283,247 describes a tearing machine consisting of a trough-shaped plate, a perforated feed roller, a drum with spikes, and a suction duct.

Belgian Pat. No. 662,569 also describes a tearing machine in a particular for treating cotton wastes. The material is driven by a trough-shaped plate provided at its ridge with a specially serrated knife and with a cylinder which is also serrated. A hook drum is mounted parallel to the axis and at the same level.

The purposes of all these methods are merely to improve fiber separation, but do not contribute to shorten them. It must be emphasized that it is even the opposite goal which is pursued since the object is to recover intact fibers once the fiber pad has been opened or torn.

The object of the invention is to offer a process making it possible to shorten the cotton fibers so as to make them useful when manufacturing absorbing pads for paper diaper-making machines which typically are fed with paper pulp.

The parameters and components of the apparatus for implementing the process of the invention are as follows:

the pressure exerted by the feed roller on the fiber pad exceeds 0.25 MPa;

the tangential speed of the drum provided with cutting roughnesses is at least 50 times that of the tangential speed of the feed roller;

in the vertical space between the top of the trough-shaped plate and the drum provided with cutting roughnesses a means is provided making it possible to tear a part or the whole of the textile fibers with a length in excess of 10 mm.

The rounded roughnesses provided on the feed roller may consist of cross-sectionally circular transverse bars or flutings making possible simultaneously, the advance of the pad and its being kept in place, that is, these roughnesses prevent the pad subjected to the action of the cutting-roughnesses drum from slipping.

Preferably the fiber pad consists of fibers from wastes recovered in spinning mills or cotton treatment plants. As a rule cotton wastes consist of fiber lengths far too large to be transformed as such on diaper-making machines. Furthermore, the capability of re-using these cotton wastes is one of the significant advantages offered by the invention. The economies flowing from this fact are reflected in the price of the raw material from which the absorbing pads are made, and it decreases by that amount the manufacturing price of the article which in this case is disposable. The absorbing material obtained in this manner can be estimated to cost twice or three times less than that prepared from paper pulp fibers.

The means used to tear all or part of the textile fibers with a length exceeding 10 mm may be a cutting blade located at the bottom of the trough on the side of the cutting-roughnesses drum.

The following may be among the cutting-roughnesses drums: drums with spikes, drums with sawteeth, drums with needles, drums with hooks. Among the above, the sawtooth and spike drums are preferred, and especially the drums comprising at least 50,000, and preferably 70,000 to 90,000, spikes.

Preferably the gap between the end of the cutting roughnesses and the upper edge of the vertical projection is between 0.1 and 1 mm, and preferably between 0.2 and 0.6 mm.

In order to obtain a more homogeneous statistical distribution of the fiber lengths, the above-described operation preferably is restarted several times but in the absence of the means for tearing the fibers. Preferably the above-stated operation is begun over twice, and better yet, three times. In the first operation, that is the one more specifically the object of the invention, the porcupine drum offers the best results. Preferably the tangential speed of the feed roller is between 0.05 m/s and 0.3 m/s and that of the cutting-roughnesses drum is between 25 m/s and 70 m/s, and in particular between about 0.15 and 0.25 m/s for the feed roller and 35 and 45 m/s for the cutting-roughnesses drum.

Another object of the invention are textile fibers and in particular bleached cotton fibers of which at least 70% have lengths between 5 and 15 mm, where these fibers are prepared by the above-described process. Preferably at least 40% of the fibers have lengths between 5 and 10 mm, and 30% at least have lengths between 10 and 15 mm.

Another object of the invention is the use of these textile fibers in making absorbing and disposable pads, in particular baby diapers.

The textile fibers obtained in the invention are much more absorbent than the fibers prepared from cellulose pulp; and, moreover, those of the invention offer a lesser leakage rate in the diapers. The invention is illustrated by describing a detailed embodiment and then by examples.

DETAILED DESCRIPTION OF THE INVENTION

FIG. 1 is a longitudinal section of the apparatus for implementing the process of the invention.

FIG. 2 is a longitudinal section of the apparatus implementing the preferred process of the invention. This is the process wherein the cutting operation is performed three times using three operational assemblies A, B, C.

The fiber pad 1 consists of bleached cotton wastes and is moved in continuous manner on a trough-plate 2 by means of a conveyor belt 3. A fluted or grooved feed roller 5 is located so as to hug the concave side 4 of the trough-plate 2. This roller rotates in the direction shown by the arrow and exerts a pressure between 0.3 and 0.6 MPa on the pad by means of the transmission shaft 6. The vertical edge 8 opposite the vertical edge 7 facing the conveyor belt 3 is bevelled at its top. The bevel 9 is at an angle to the vertical which amounts to $0.01\pi$ to $0.1\pi$. The bevel 9 passes through a shoulder 10 into the convex side 4. This shoulder coincides with the line connecting the centers of the feed roller 5 and the procupine drum 11 described below. A drum 11 provided with 80,000 spikes is located next to the vertical edge 8 and rotates in the same direction as the feed roller. This drum pulls the pad beyond the shoulder and tears thereby the long fibers while opening the short ones. The fibers so processed are moved by means of pulsed air from the blower 29 through a conduit consisting of the inside drum surface and a support 12 to the exit 13 communicating with a compartment 14 where the fiber pad can be reconstituted. This compartment consists at the exit 13 of a support 15 extending the support 12 and moving the fibers to make contact with a drum 16 rotating oppositely to the preceding drum. This drum 16 itself makes contact at a point substantially opposite support 15 with an operational roller 17 rotating in the same direction as drum 16. The drum 17 itself is adjacent to a drum 18 rotating in the inverse direction so as to compact the sheet when passing between the two rollers and then to evacuate it.

The dimensions of the components of the above-described apparatus are the following:

|  | in mm |
| --- | --- |
| diameter of feed roller 5 | 180 |
| diameter of porcupine drum 11 | 1000 |
| diameter of drum 16 | 780 |
| diameter of compacting roller 17 | 130 |
| diameter of compacting roller 18 | 180 |
| dimension of bevel 9 | h = 6 mm; w = 1 mm |

FIG. 2 shows the apparatus for implementing the preferred process of the invention, that is in the three successive operations. Once the torn fiber sheet has been compacted between the rollers 17 and 18, it is re-introduced in a compartment 19 including a trough-plate 20 with a rounded upper edge, that is a wholly conventional trough-plate, and a sawtooth drum 21 with the teeth directed in the sense of the rotation, whereupon said sheet is moved to a compartment 22 identical with the compartment 14 and for forming the sheet. Where the third operation is called for, the sheet passes into a compartment 23 identical with the compartment 19 and including a trough-plate 24 and a sawtooth drum 25, and then again moves into a sheet-constituting compartment 26 identical with the compartments 14 and 22, and lastly it is moved toward the exit 27. Now being constituted, the sheet is directly fed to the diaper-making machine 28 (not shown).

Regarding the two-operation process, the procedure is as follows:

during the second operation, the drum is a sawtooth drum, the pressures exerted by the feed rollers are between 0.3 and 0.6 MPa, the tangential rotational speed of the various rollers and drums is between the values below:

|  |  | in m/s |
| --- | --- | --- |
| 1st operation | feed roller | 0.15 to 0.25 |
|  | cutting-roughnesses drum | 35 to 45 |
| 2nd operation | feed roller | 0.11 to 0.2 |
|  | cutting-roughnesses drum | 40 to 60 | the gaps between the cutting-roughnesses drum on one hand and the lines extending the vertical part of the edge 8 opposite the cutting-roughnesses drum on the other are between 0.3 and 0.6 mm in the first operation and between 0.2 and 0.5 mm for the second operation.

Regarding the three-operation process, preferably the procedures are as follows:

in the second operation the cutting-roughnesses drum preferably is a sawtooth drum, the pressure applied by the various feed rollers is between 0.3 and 0.6 MPa, the tangential speed of rotation of the various rollers and drums is as follows:

|  |  | in m/s |
| --- | --- | --- |
| 1st operation | feed roller | 0.15 to 0.25 |
|  | cutting-roughnesses drum | 35 to 45 |
| 2nd operation | feed roller | 0.11 to 0.2 |
|  | cutting-roughnesses drum | 40 to 60 |
| 3rd operation | feed roller | 0.11 to 0.2 |
|  | cutting-roughnesses drum | 40 to 60 | the gaps between the cutting-roughnesses drum on one hand and the line extending the vertical part of the edge opposite the cutting-roughnesses drum on the other are between 0.3 and 0.6 mm in the first operation and between 0.2 and 0.5 mm for the second and third operations.

The examples below illustrate the invention.

EXAMPLE 1

Two Successive Operations

First Operation

The feed roller applies a pressure of 0.50 MPa and rotates at 0.2 m/s. The specific weight of the bleached cotton pad is 800 g/m². The drum comprises 80,000 spikes and rotates at 40 m/s. The gap between the edge vertical wall and the drum tangent is 0.4 mm.

Second Operation (No bevel, with conventional trough-plate)

The feed roller features are the same as in the first operation except that its rotational speed is 0.16 m/s. In this instance the drum is one with sawteeth, it rotates at 55 m/s. The gap between the edge vertical wall and the drum tangent again is 0.4 mm.

Following these two operations, the fibers are collected; their statistical distribution with respect to length is as follows:

| Fiber Length (in mm) | % |
| --- | --- |
| 5-10 | 50 |
| 10-15 | 35 |
| 15-20 | 8 |
| 20-25 | 5 |
| 25-30 | 2 |

EXAMPLE 2

Three Successive Operations

The first two operations are identical with those described in Example 1. After the second operation, the fiber pad is subjected to the following third operation:

the roller characteristics are the same as for the second operation, namely the pressure is 0.50 MPa and the speed is 0.16 m/s, the drum has sawteeth and rotates at 55 m/s. The gap between the drum tangent and the vertical wall of the edge is reduced to 0.3 mm.

Following these three operations, the fibers are collected; their statistical distribution with respect to length is as follows:

| Fiber Length (in mm) | % |
| --- | --- |
| 5-10 | 50 |
| 10-15 | 40 |
| 15-20 | 10 |

EXAMPLE 3

Three Successive Operations

The three operations were carried out with 80,000 spike drums under the same conditions as for Example 2 as regards the gaps, the speeds, and pressures. Fibers are collected of which the statistical distribution with respect to length is as follows:

| Fiber Length (in mm) | % |
| --- | --- |
| 5-10 | 50 |
| 10-15 | 35 |
| 15-20 | 6 |
| 20-25 | 5 |
| 25-30 | 3 |

EXAMPLE 4

Absorptivity

The absorptivity of the fiber pad of Example 2 was rated as follows:

Diapers weighing 58 g and including 49 g of fibers were worn by a score of babies. These diapers absorb about 4.8 g of body fluids per gram of fibers, whereas under the same conditions diapers including cellulose foam (fluff) absorb only 4 grams per gram of fibers. The gain in absorptivity, therefore, is 20%. Moreover, it was observed long-term that the "cotton" diapers leak less than the "fluff" diapers.

I claim:

1. A process for shortening textile fibers comprising
   (a) continuously moving a pad of fibers between a trough-plate and a feed roller provided with a rounded roughness which rotates in the feed direction of the fiber pad and compresses said pad, the pressure exerted by said feed roller on said fiber pad being controlled so as to exceed 0.25 MPa;
   (b) pulling the fiber pad beyond said roughness plate by means of a drum provided with a cutting roughness rotating in the same direction as the feed roller but at a tangential speed at least 50 times that of the speed of the feed roller; and
   (c) tearing at least a part of the textile fibers having a length exceeding 10 mm of said fiber pad, said tearing being obtained by engaging said fibers with means located in a vertical space between the top of said trough-plate and the cutting roughness of said drum to cause said tearing of said textile fibers with a length in excess of 10 mm.

2. Process according to claim 1 wherein said fiber pad comprises bleached cotton wastes.

3. Process according to claim 1 further including the step of (d) reconstituting the pad of fibers.

4. Process according to claim 3 wherein after the fiber pad has been reconstituted, steps (a) and (b) are repeated at least once.

5. Process according to claim 4 wherein during the repeat operation, the pressure applied by the feed rollers is between about 0.3 and about 0.6 MPa, and the rotational tangential speed of the various rollers and drums are as follows:

|  |  | in m/s |
| --- | --- | --- |
| First operation: | feed roller | 0.15 to 0.25 |
|  | cutting-roughness drum | 35 to 45 |
| Repeat operation: | feed roller | 0.11 to 0.2 |
|  | cutting-roughness drum | 40 to 60 | and the gaps between the cutting-roughness drums and the lines extending the vertical part of the edge being controlled to be between about 0.3 and about 0.6 mm for the first operation and between about 0.2 and about 0.5 mm for the repeat operation.

6. Process according to claim 1 wherein the pressure exerted on the fiber pad by the feed roller is controlled to be between about 0.3 and about 0.6 MPa.

7. Process according to claim 1 wherein the tangential speed of the feed roller is controlled to be between about 0.05 m/s and about 0.3 m/s, and that of the cutting-roughness drum is controlled to be between about 25 m/s and about 70 m/s.

8. Process according to claim 1 wherein the cutting-roughness drum is selected from the sawtooth or porcupine drums.

9. Process according to claim 8 wherein the drums comprise at least 50,000 spikes.